(12) United States Patent
Rhee

(10) Patent No.: US 7,519,648 B2
(45) Date of Patent: Apr. 14, 2009

(54) ENCODER FOR A MULTIPLIER

(75) Inventor: Young-chul Rhee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 763 days.

(21) Appl. No.: 11/054,954

(22) Filed: Feb. 11, 2005

(65) Prior Publication Data

US 2005/0182814 A1 Aug. 18, 2005

(30) Foreign Application Priority Data

Feb. 13, 2004 (KR) ...................... 10-2004-0009628

(51) Int. Cl.
*G06F 7/533* (2006.01)
(52) U.S. Cl. ................................... 708/628
(58) Field of Classification Search .................. 708/628
See application file for complete search history.

(56) References Cited

U.S. PATENT DOCUMENTS 6,065,032 A 5/2000 Nicol
6,301,599 B1 * 10/2001 Chehrazi et al. ............. 708/628
6,622,154 B1 * 9/2003 Hayashi et al. .............. 708/620
6,978,426 B2 * 12/2005 Parhi et al. ...................... 716/1
7,024,445 B2 * 4/2006 Qi .............................. 708/628
7,308,470 B2 * 12/2007 Ng .............................. 708/628
7,308,471 B2 * 12/2007 Rumynin ..................... 708/628
2003/0158880 A1 * 8/2003 Ng .............................. 708/628

FOREIGN PATENT DOCUMENTS

| JP | 2002-323346 | 11/2002 |
| KR | 1994-703048 | 9/1994 |
| KR | 1997-71248 | 12/1997 |

* cited by examiner

*Primary Examiner*—David H Malzahn
(74) *Attorney, Agent, or Firm*—Harness, Dickey & Pierce, P.L.C.

(57) ABSTRACT

An encoder of a multiplier may include an operator generating unit for encoding a plurality of received multiplier data to output a plurality of operators. The encoder may include a partial-product data generating unit that generates a sign selecting operator from the received multiplier data for determining signs of the operators and output paths for the multiplicand data therein prior to receiving the plurality of operators from the operator generating unit, and outputs partial-product data in response to the received plurality of operators.

23 Claims, 7 Drawing Sheets

| Y2j+1 | Y2j | Y2j-1 | OPERATOR | 1x | p2x | l_p2x | n2x | SIGN |
|---|---|---|---|---|---|---|---|---|
| 0 | 0 | 0 | 0X | 0 | 1 | 0 | 1 | 0 |
| 0 | 0 | 1 | +1X | 1 | 1 | 0 | 0 | 0 |
| 0 | 1 | 0 | +1X | 1 | 1 | 0 | 0 | 0 |
| 0 | 1 | 1 | +2X | 0 | 0 | 1 | 0 | 0 |
| 1 | 0 | 0 | −2X | 0 | 1 | 0 | 1 | 1 |
| 1 | 0 | 1 | −1X | 1 | 1 | 0 | 0 | 1 |
| 1 | 1 | 0 | −1X | 1 | 1 | 0 | 0 | 1 |
| 1 | 1 | 1 | 0X | 0 | 0 | 1 | 0 | 1 |

FIG. 6
| Y2j-1 | Y2j | NOR31 | NAND31 | XOR 31 |
|---|---|---|---|---|
| 0 | 0 | 1 | '1' → | 0 |
| 0 | 1 | 0 | 1 | 1 |
| 1 | 0 | 0 | 1 | 1 |
| 1 | 1 | 0 | 0 | 0 |
FIG. 7A
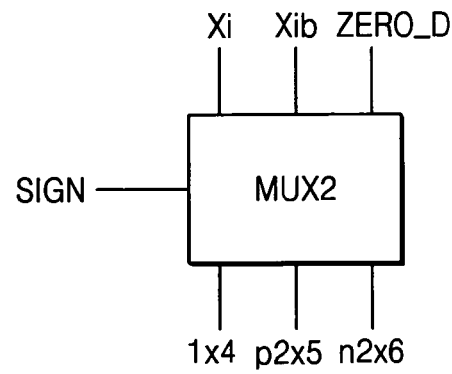
FIG. 7B
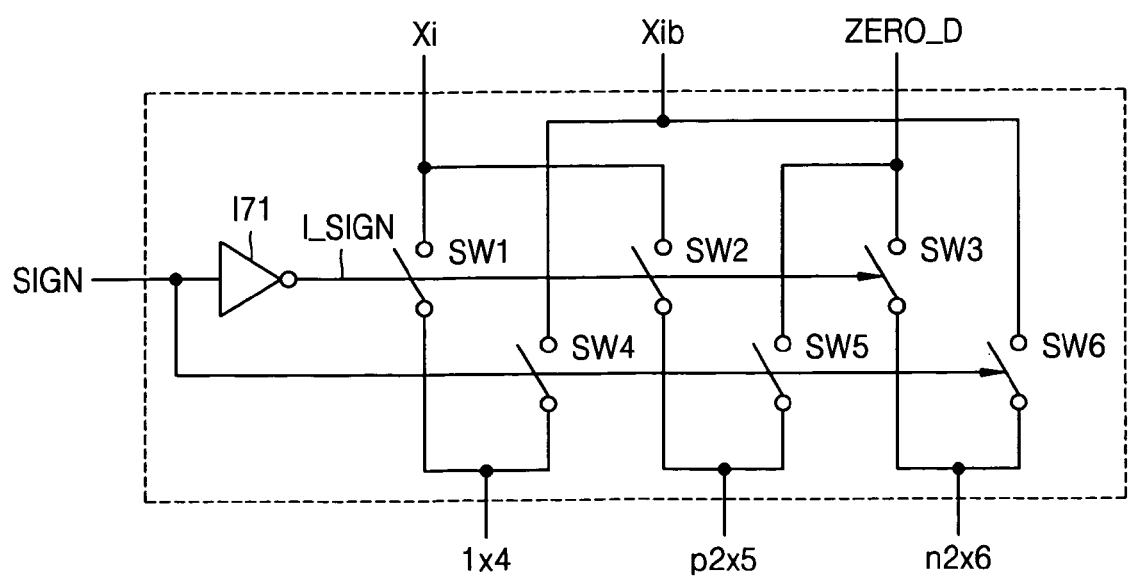

ENCODER FOR A MULTIPLIER

CROSS-REFERENCE TO RELATED APPLICATIONS

This application claims the priority of Korean Patent Application No. 2004-9628, filed on Feb. 13, 2004, in the Korean Intellectual Property Office, the disclosure of which is incorporated herein in its entirety by reference.

BACKGROUND OF THE INVENTION

1. Field of the Invention

The present invention relates, in general, to an encoder for a multiplier employing a Booth algorithm.

2. Description of the Related Art

Binary multiplication is an important function in many digital signal processing applications. Some applications further require arithmetically combining a product with the results of previous operations (e.g. forming a sum of products). A versatile multiplier circuit should have the capability to perform these functions in either a two's complement or an unsigned magnitude notation.

Binary numbers are multiplied very much like decimal numbers. More particularly, each digit of one operand (multiplicand) is multiplied by each digit of the other operand (multiplier) to form partial products and these resulting partial products are then added, taking into account the multiplier digit position place significance.

Circuits for multiplying binary numbers require a relatively large number of circuit elements and thus take up a fair amount of chip area when fabricated on an integrated circuit. For this reason, an ongoing goal of integrated circuit designers is to find ways to implement a multiplier circuit ('multiplier') with fewer and fewer circuit elements.

Conventional multipliers may include encoders, compressors, and adders. The encoders are blocks that encode multipliers and multiplicands and generate partial sums through multiplications of the multipliers and the multiplicands. The encoders in these multipliers may employ many known techniques for reducing the time required to perform a binary multiplication. For example, different encoding methods have been devised which reduce the number of partial products which must be added up to form the final product and for speeding up the addition of partial products. As an example, the encoders may employ a corrected Booth algorithm (also known as a modified Booth algorithm) to reduce the number of partial sums.

The modified Booth algorithm (hereafter 'Booth algorithm') is a multiplication method that enhances a multiplication speed by reducing the number of multiplications of the multipliers and the multiplicands having a plurality of bits during encoding. The algorithm encodes one of the two numbers being multiplied. This approach reduces, usually by a factor of two, the number of partial products generated by the multiplier, thereby reducing the amount of circuitry needed to combine the partial products in arriving at the final product.

FIG. 1A is a diagram illustrating an encoder cell of a conventional multiplier employing the Booth algorithm; and FIG. 1B is a diagram illustrating a partial-product cell of a conventional multiplier employing the booth algorithm. The conventional encoders of a multiplier employing the corrected or modified Booth algorithm may be comprised of encoder cells that generate operators using the multipliers and partial-product cells that encode the multiplicand using the operators. FIGS. 1A and 1B show only encoder cell and partial-product cell portions thereof, which would be part of a multiplier including adders and compressors, for example.

As shown in FIG. 1A, the conventional encoder cell 100 may include an exclusive logical sum gate XOR11, logical product gates AND11, AND12, a multiplexer MUX11, and buffers B11, B12, B13.

The encoder cell 100 encodes first to third multiplier data Y2j−1, Y2j, Y2j+1 and selectively outputs operators 1X, 2X, NEG. Each multiplier data Y2j−1, Y2j, Y2j+1 may be comprised of a plurality of bits, with Y2j−1, Y2j representing adjacent sets of bits, the bits of Y2j−1 being of lesser significance than the bits of Y2j. In an example, each of the first to third multiplier data Y2j−1, Y2j, Y2j+1 may represent three given places of bits of a multiplier Y input to the encoder cell 100. The output operator 1X indicates that a multiplicand X has been multiplied by 1, operator 2X indicates that the multiplicand X has been multiplied by 2, and the operator NEG indicates whether the multiplicand X is multiplied by a positive value or a negative value (i.e., the signs of the output operators 1X and 2X are determined by the operator NEG). The first to third multiplier data Y2j−1, Y2j, Y2j+1 and the operators 1X, 2X, NEG have relationships as shown in Table 1.

TABLE 1

Truth Table of logic states for multipliers and operators

| Y2j + 1 | Y2j | Y2j − 1 | OPERATOR | X | 2X | NEG |
|---|---|---|---|---|---|---|
| 0 | 0 | 0 | 0X  | 0 | 0 | 0 |
| 0 | 0 | 1 | +1X | 1 | 0 | 0 |
| 0 | 1 | 0 | +2X | 1 | 0 | 0 |
| 0 | 1 | 1 | −2X | 0 | 1 | 0 |
| 1 | 0 | 0 | −1X | 0 | 1 | 1 |
| 1 | 0 | 1 | 0X  | 1 | 0 | 1 |
| 1 | 1 | 0 |     | 1 | 0 | 1 |
| 1 | 1 | 1 |     | 0 | 0 | 1 |

Referring to FIG. 1B, the partial-product cell 110 shown in FIG. 1B may include inverted logical product gates NAND11, NAND12, NAND13 and an exclusive logical sum gate XOR12. The partial-product cell 110 selects output paths of the multiplicand data Xi, Xi−1 received in response to the operators 1X, 2X, NEG which are output from the encoder cell 100 to the partial-product cell 110, so as to output the selection results as partial-product data Pi, 2j.

One of the problems facing conventional multipliers in general and the conventional encoder cells and partial-product cells in such multipliers is that there may be substantial delay in generating partial-product data for a multiplicand, making it difficult to achieve high-speed partial product generation. For example, as seen in FIGS. 1A and 1B, the conventional encoder of the conventional multiplier has a three-gate delay maximum including the buffers in the encoder cell 100 (see, for example, AND11, MUX11 and inverter B12 to output operator 2X) and a three-gate delay in the partial-product cell 110 (see, for example, NAND12, NAND13 and XOR12 to generate partial-product data Pi, 2j), so that the encoder has a total of a six-gate delay in order to generate partial-product data from the input multiplier data Y2j−1, Y2j, Y2j+1 and multiplicand data Xi, Xi−1 received in response to the operators 1X, 2X, NEG. As used herein, gate delay may refer to a signal delay as a signal passes through a transistor gate within a given component such as a MUX, one of an AND, NAND, OR, XOR gate, and/or a buffer/inverter component.

That is, the partial-product data Pi, 2j are output after the multiplier data Y2j−1, Y2j, Y2j+1 and the multiplicand data Xi, Xi−1 pass through the six gates (for example, AND11, MUX11, B12, NAND12, NAND13, and XOR12). This delay time may thus cause an undesirable reduction in operation speed of the multiplier.

Further, since the operator NEG having only a one-gate delay (buffer delay at B13) reaches the exclusive logical sum gate XOR12 (which represents an output terminal of the partial-product cell 110) prior to the other operators 1X, 2X reaching XOR12 (due to the three-gate delay), the exclusive logical sum gate XOR12 is turned on for an unnecessarily long duration, so that leakage currents could be generated regardless of generation of the partial-product data Pi, 2j. In other words, the operators NEG, 1X and 2X do not arrive at XOR12 at the same time.

Further, the conventional encoder has a relatively large number of pass transistors. Thus, the circuit scale for the encoder, and hence the multiplier is large and takes up a fair amount of chip area when fabricated on an integrated circuit.

FIG. 2A is a diagram illustrating the encoder cell of another conventional multiplier employing the Booth algorithm; and FIG. 2B is a diagram illustrating the partial-product cell of another conventional multiplier employing the Booth algorithm.

As shown in FIGS. 2A and 2B, encoder cell 200 may include an inverted exclusive logical sum gate XNOR21, a logical product gate AND21, a logical sum gate OR21, an inverted logical gate NAND21, an inverted logical sum gate NOR21, and inverters I21 to I27.

The encoder cell 200 encodes first to third multiplier data Y2j−1, Y2j, Y2j+1 of multiplier data having a plurality of bits, and selectively outputs operators 1X, 2X, PL, M (as shown in FIGS. 2A and 2B, binary complements PLb and Mb of the operators PL and M (due to inversion at inverters I26 and I27) are output as operators from encoder cell 200. The first to third multiplier data Y2j−1, Y2j, Y2j+1 and the operators 1X, 2X, PL, M have relationships as shown in Table 2.

TABLE 2

Truth Table of logic states for multipliers and operators

| Y2j + 1 | Y2j | Y2j − 1 | OPERATOR | X | 2X | PL | M |
|---|---|---|---|---|---|---|---|
| 0 | 0 | 0 | 0X | 0 | 1 | 0 | 0 |
| 0 | 0 | 1 | +1X | 1 | 0 | 1 | 0 |
| 0 | 1 | 0 | +2X | 1 | 0 | 1 | 0 |
| 0 | 1 | 1 | −2X | 0 | 1 | 1 | 0 |
| 1 | 0 | 0 | −1X | 0 | 1 | 0 | 1 |
| 1 | 0 | 1 | 0X | 1 | 0 | 0 | 1 |
| 1 | 1 | 0 |  | 1 | 0 | 0 | 1 |
| 1 | 1 | 1 |  | 0 | 1 | 0 | 0 |

Signs of the operators 1X, 2X in Table 2 may be determined by logic levels of the operators PL, M. PL indicates a positive sign, and M indicates a negative sign.

The partial-product cell 210 shown in FIG. 2B includes inverters I28 and I29 and multiplexers MUX21, MUX22, MUX23, MUX24. The partial-product cell 210 selects output paths of multiplicand data Xi, Xi−1 to be received in response to the operators 1X, 2X, PL, M output from the encoder cell 200, and outputs the selection results as partial-product data Pi, 2j, Pi−1, 2j.

The conventional encoder of FIGS. 2A and 2B has reduced delay time therein as compared to the encoder of FIGS. 1A and 1B. In the encoder shown in FIGS. 2A and 2B, an encoding process of the partial-product cell 210 is improved since fewer transistors are employed by using the operators PL, M. As shown in FIG. 2A, for the multiplier data Y2j−1, Y2j, the encoder cell 200 has a maximum of a three-gate delay (including the inverters) in order to generate operators 1X, 2X, PL and M, and the partial-product cell 210 has a maximum of a two-gate delay to generate partial-product data Pi, 2j, Pi−1, 2j.

Therefore, although some signal paths between the input multiplier data and the generated partial-product data Pi, 2j, Pi−1,2j may have less delay, at least one path in the encoder of FIGS. 2A and 2B has at least a five-gate delay in total. Thus, the encoder of FIGS. 2A and 2B has a total gate delay time that is shortened by one gate, as compared with the encoder of FIGS. 1A-1B. However, since the circuit construction of the encoder cell 200 is complicated due to the operators PL, M, and since the operators PL, M are delayed by at least one gate more than are the other operators 1X, 2X (i.e., the sign operators are generated later than the operators 1X, 2X), operation speed of a multiplier with the conventional encoder of FIGS. 2A and 2B may still be slowed.

SUMMARY OF THE INVENTION

An exemplary embodiment of the present invention may be directed to an encoder of a multiplier. The encoder may include an operator generating unit for encoding a plurality of received multiplier data to output a plurality of operators. The encoder may include a partial-product data generating unit that generates a sign selecting operator from the received multiplier data for determining signs of the operators and output paths for the multiplicand data therein prior to receiving the plurality of operators from the operator generating unit, and outputs partial-product data in response to the received plurality of operators.

Another exemplary embodiment of the present invention may be directed to an encoder of a multiplier configured to multiply bits of multiplier data with bits of multiplicand data. The encoder may include at least one encoding cell adapted to encode adjacent first and second multiplier data of two bits to output at least a first, second and third operator, a first selection unit and a second selection unit. The first selection unit may receive third multiplier data of higher bits adjacent to the bits of the second multiplier data as a sign selecting operator for determining the signs of the at least first, second and third operators, and to select an output path for given two-bit multiplicand data and zero data in response to the sign selecting operator. The second selection unit may select the output paths of the given two-bit multiplicand data output from the first selection unit and multiplicand data output from another selection circuit in response to the first, second, and third operators to output the multiplicand data as the partial-product data.

Another exemplary embodiment of the present invention may be directed to an encoder of a multiplier configured to multiply bits of multiplier data with bits of multiplicand data. The encoder may be configured to generate partial-product data from received multiplier data and received multiplicand data with only a three-gate delay.

Another exemplary embodiment of the present invention is directed to a method of generating partial product-data in an encoder of a multiplier configured to multiply multiplier data with multiplicand data. In the method, a plurality of received multiplier data may be encoded to output a plurality of operators. A sign selecting operator may be generated from the received multiplier data for determining signs of the operators and output paths for multiplicand data therein prior to receiving the plurality of operators, and partial-product data may be output in response to the received plurality of operators.

Another exemplary embodiment of the present invention is directed to a partial-product data generating unit for an encoder of a multiplier configured to multiply multiplier data with multiplicand data. The partial-product data generating unit may generate a sign selecting operator from the received multiplier data for determining signs of a plurality of operators to be received thereto and output paths for multiplicand data therein, prior to receiving the plurality of operators, and may output partial-product data in response to the received plurality of operators.

Another exemplary embodiment of the present invention is directed to an operator generating unit for an encoder of a multiplier configured to multiply multiplier data with multiplicand data. The operator generating unit may comprise at least one encoding cell. The at least one encoding cell may include an exclusive logical sum gate performing a logical sum operation on adjacent bits of first and second multiplier data to output a first operator, an inverted logical product gate performing an inverted logical product operation on the first and second multiplier data to output a second operator, and an inverted logical sum gate performing an inverted logical sum operation on the first and second multiplier data to output a third operator.

BRIEF DESCRIPTION OF THE DRAWINGS

The above and other features and advantages of the present invention will become more apparent from detailed description of exemplary embodiments thereof with reference to the attached drawings in which:

FIG. 6 is a diagram illustrating a truth table of an inverted logical sum gate, an inverted logical product gate, and an exclusive logical sum gate of the encoder cell of FIG. 3.

FIG. 7A is a diagram illustrating a second multiplexer of FIG. 3.

FIG. 7B is a diagram illustrating details of the second multiplexer of FIG. 7A.

DETAILED DESCRIPTION OF THE EXEMPLARY EMBODIMENTS

Figure 1A:
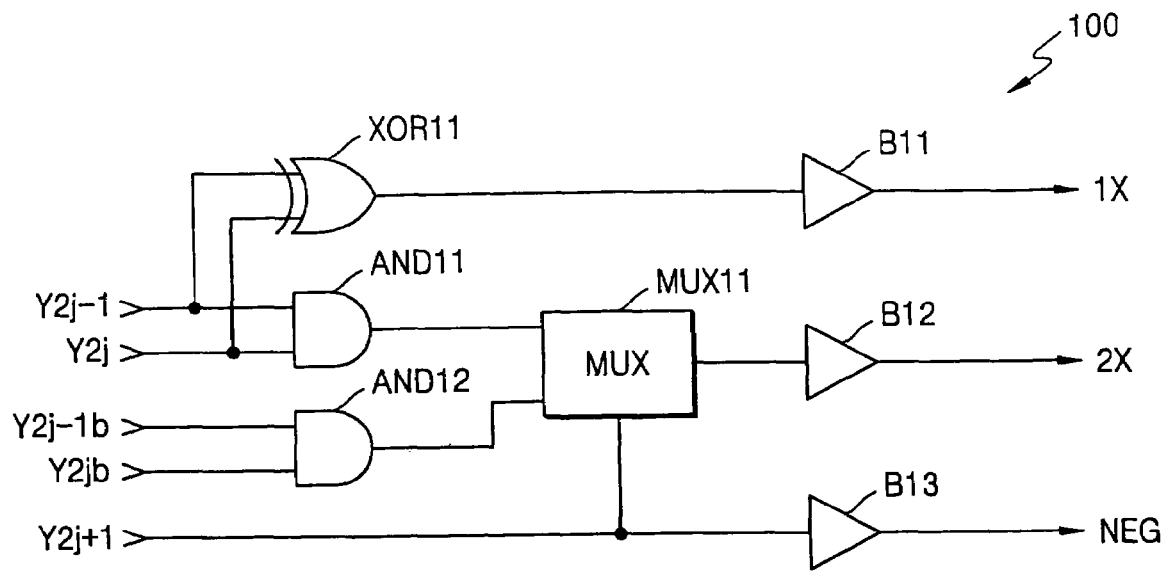
FIG. 1A is a diagram illustrating an encoder cell of a conventional multiplier employing the booth algorithm.
Figure 1B:
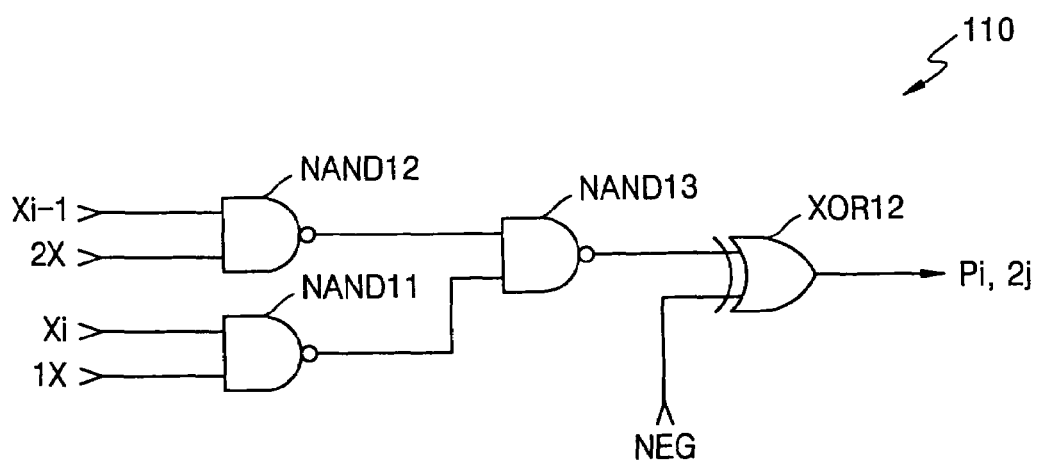
FIG. 1B is a diagram illustrating a partial-product cell of a conventional multiplier employing the booth algorithm.
Figure 2A:
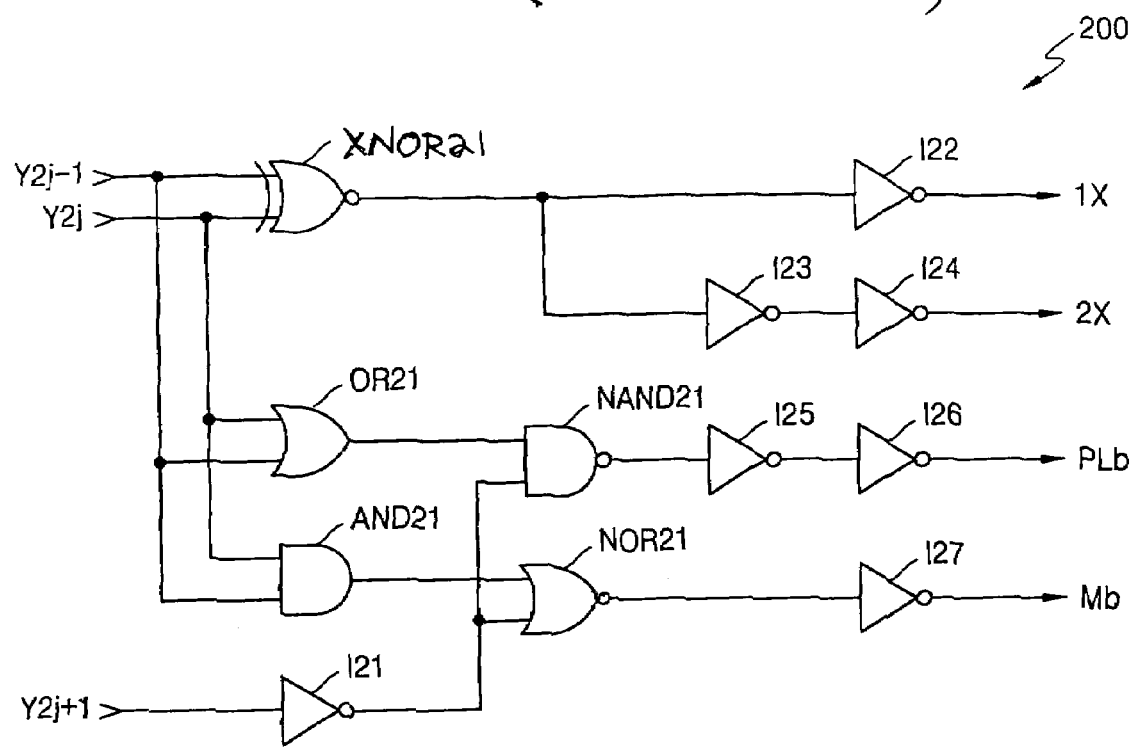
FIG. 2A is a diagram illustrating an encoder cell of another conventional multiplier employing the booth algorithm.
Figure 2B:
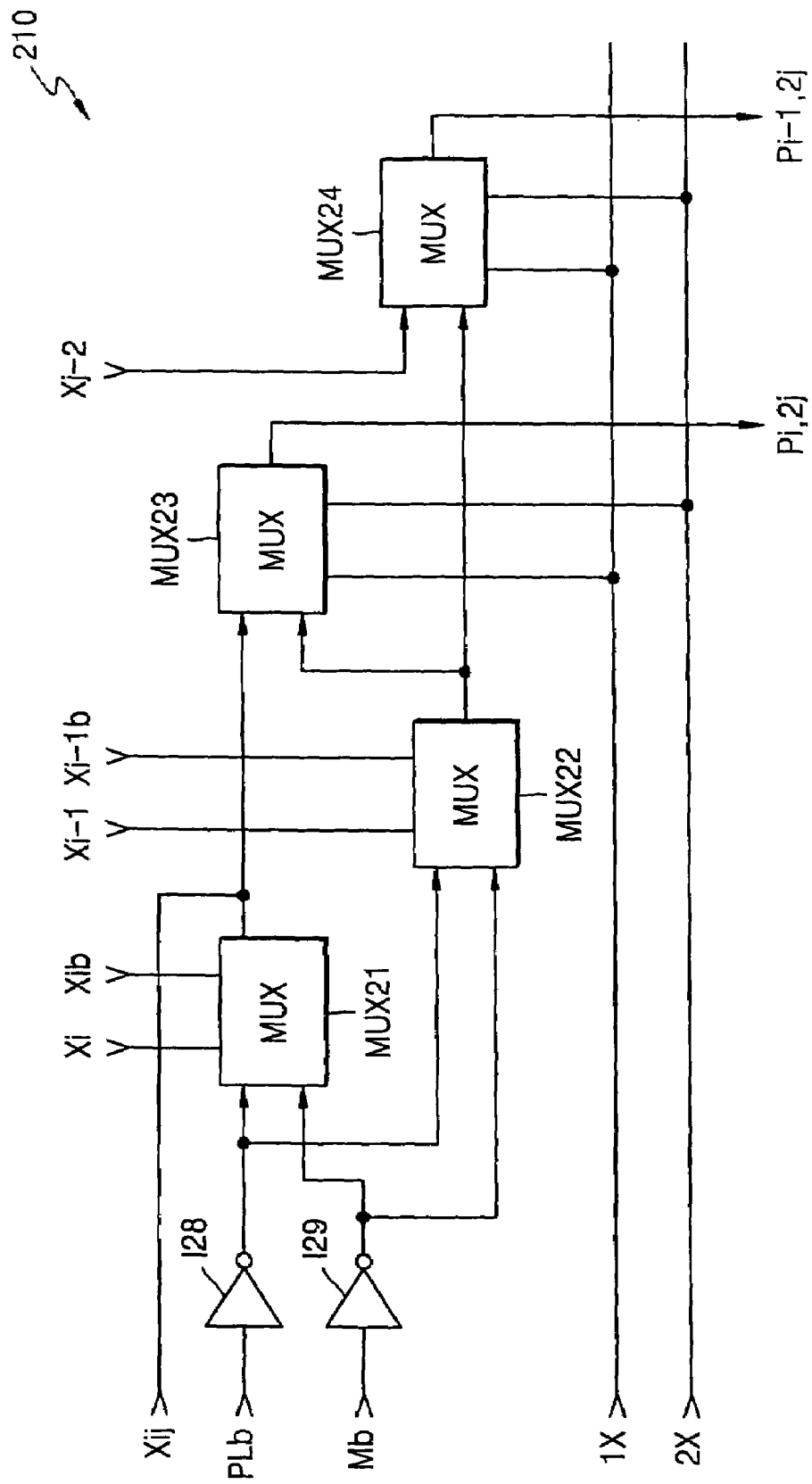
FIG. 2B is a diagram illustrating a partial-product cell of another conventional multiplier employing the booth algorithm.
Figure 3:
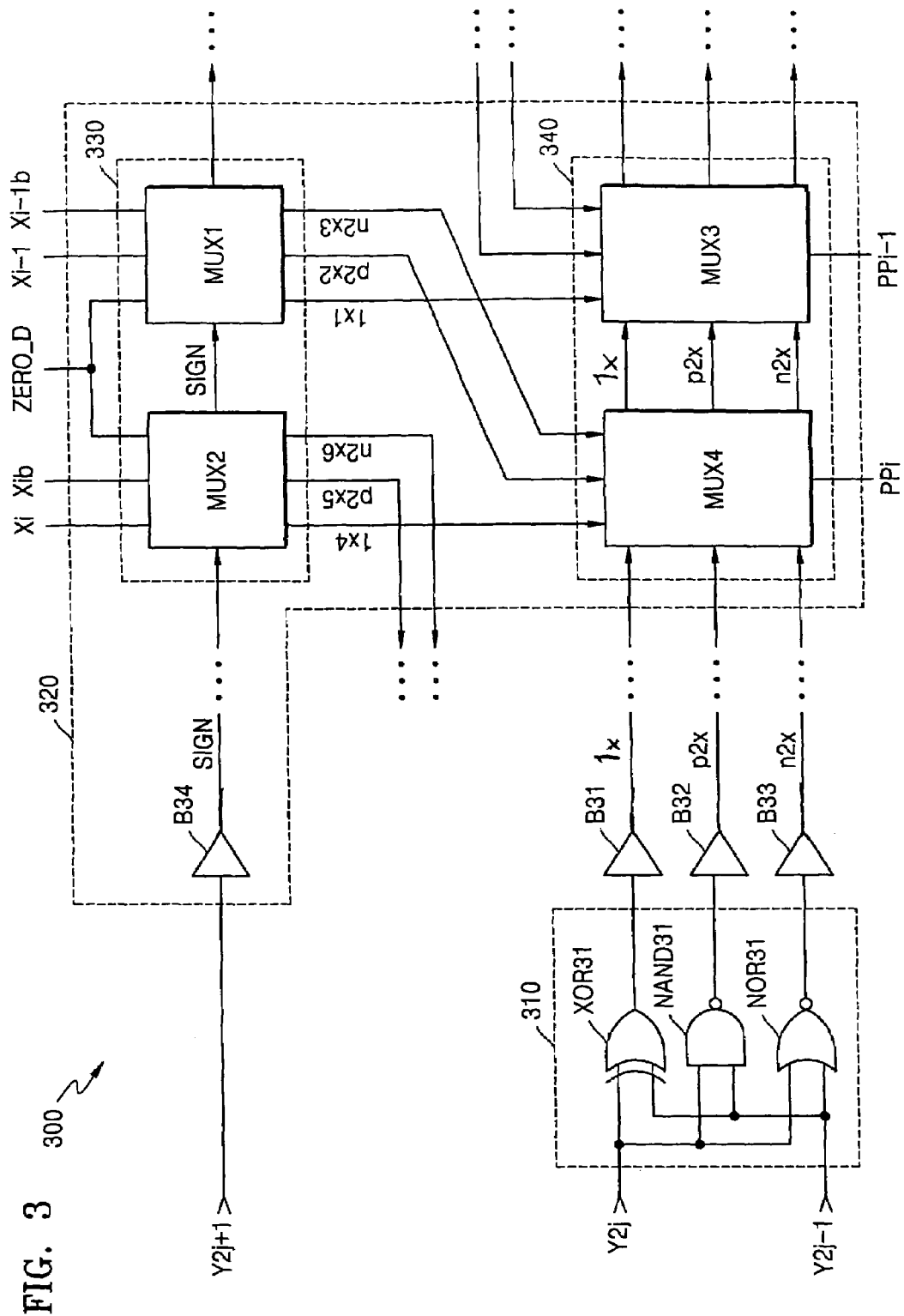
FIG. 3 is a circuit diagram illustrating an encoder according to an exemplary embodiment of the present invention.
Figures 4, 5:
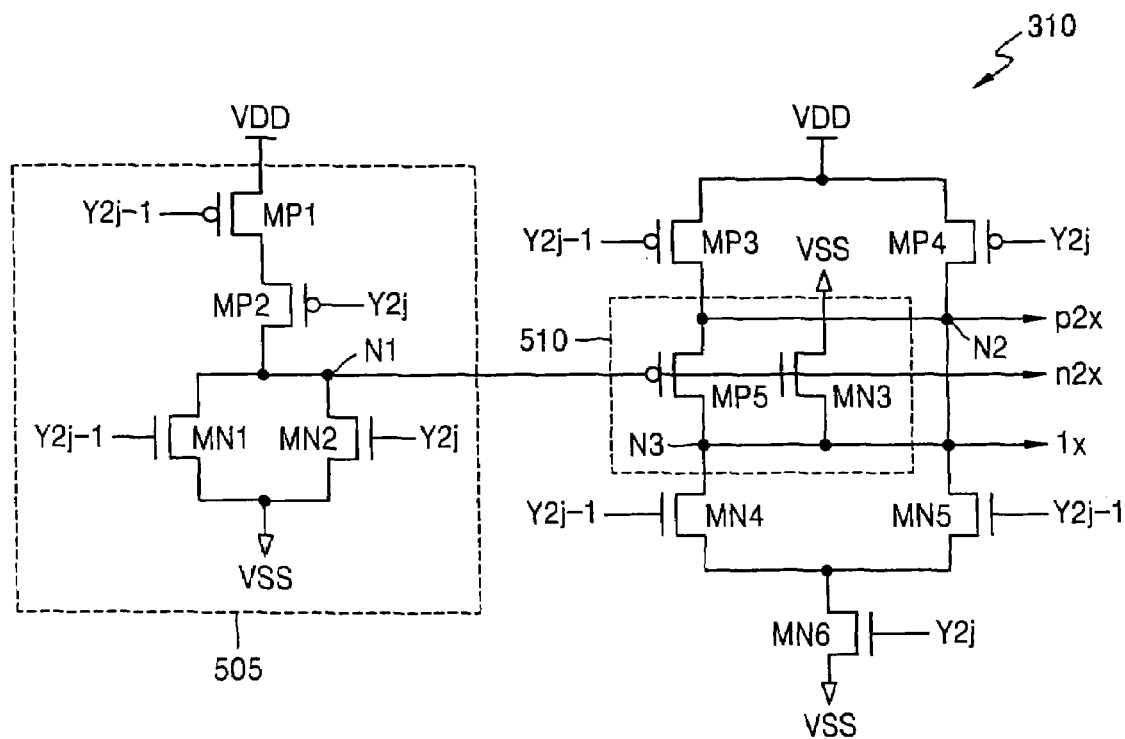
FIG. 4 is a table illustrating a plurality of operators generated by the encoder of FIG. 3.
FIG. 5 is a circuit diagram illustrating details of the encoding cell of FIG. 3.

FIG. 3 is a circuit diagram illustrating an encoder according to an exemplary embodiment of the present invention; and FIG. 4 is a truth table illustrating a plurality of operators generated in the encoder of FIG. 3. FIGS. 3 and 4 should be referenced for the following discussion.

In general, the exemplary encoder 300 described hereafter for a multiplier may include an operator generating unit for encoding multiplier data so as to output a plurality of operators, and a partial-product data generating unit that receives multiplicand data and outputs partial-product data resulting from a multiplication operation of the multiplier data and multiplicand data in response to the plurality of operators. The multiplication operation of the multiplier may be completed by summing the partial-product data output from the partial-product data generating unit.

The operator generating unit may be embodied as one or a plurality of encoding cells 310 to encode a plurality of multiplier data such as three bits (Y2j+1, Y2j and Y2j-1) to output the operators. In an example, each encoding cell may encode multiplier data of two bits (i.e., Y2j and Y2j-1) adjacent to each other in the multiplier data so as to output the operators. Although FIG. 3 shows a single encoding cell 310 for purposes of clarity and brevity, it is understood that the exemplary embodiments of the present invention may include an encoder 300 comprising a plurality of encoding cells 310. The partial-product data generating unit may be embodied by one or more selection circuits 320. The selection circuits 320 may generate the partial-product data in response to the operators output from the encoding cells 310. Although FIG. 3 shows a single selection circuit 320 for purposes of clarity and brevity, it is understood that the exemplary embodiments of the present invention may include an encoder 300 comprising a plurality of selection circuits 320.

Referring to FIG. 3, each of first multiplier data Y2j-1, second multiplier data Y2j, and third multiplier data Y2j+1 may each be comprised of a plurality of bits, with the first and second multiplier data Y2j-1, Y2j representing adjacent sets of two bits, for example, the bits of Y2j-1 being of lesser significance than the bits of Y2j. In an example, the encoding cell 310 may encode adjacent two-bit multiplier data Y2j-1, Y2j for outputting operators 1x, p2x, n2x.

The encoding cell 310 may include an exclusive logical sum gate XOR31, an inverted logical product gate NAND31, and an inverted logical sum gate NOR31. The exclusive logical sum gate XOR31 carries out an exclusive logical sum operation on the first multiplier data Y2j-1 and adjacent second multiplier data Y2j of higher (more significant bits) in order to output a first operator 1x. The inverted logical product gate NAND31 carries out an inverted logical product operation on the first multiplier data Y2j-1 and adjacent second multiplier data Y2j to output a second operator p2x; and the inverted logical sum gate NOR31 carries out an inverted logical sum operation on the first and second multiplier data Y2j-1, Y2j so as to output a third operator n2x. Encoding cell 310 may further comprise buffers B31, B32, B33 for outputting the first to third operators 1x, p2x, n2x.

The first operator 1x expresses the multiplicand data as partial-product data PPi-1, PPi "as is", i.e., with no shifting or inverting of the multiplicand data. The second operator p2x expresses data obtained by shifting the multiplicand data by one bit toward higher (more significant) bits as the partial-product data PPi-1, PPi.

The third operator n2x expresses binary complements of the partial-product data that corresponds to the second operator p2x as the partial-product data PPi-1, PPi.

Referring to FIG. 4, an operator 0X generates 0 as the partial-product data PPi-1, PPi, and an operator SIGN determines signs of the operators 0x, 1x, p2x, n2x. An operator I_p2x has a logic level opposite to the logic level of the operator p2x.

As can be seen from the encoding cell 310 of FIG. 3, the operators 1x, p2x, n2x all have one-gate delay. The sign selecting operator SIGN that determines the signs and output paths for the multiplicand data has only a buffer delay (which is relatively shorter in duration than a gate-delay). Thus the sign and output path of the multiplicand data is determined in the selection circuit 320 before the other operators 1x, p2x, n2x reach the selection circuit 320.

Therefore, since the multiplicand data are output from the selection circuit 320 as the partial-product data PPi-1, PPi by means of the other operators 1x, p2x, n2x after the sign and the output path of the multiplicand data have been determined, the delay due to the sign selecting operator SIGN is substantially negligible on encoder 300 operation. In other words, although the total delay in the encoder 300 according to this exemplary embodiment may appear to be four-gate delay, the partial-product data PPi-1, PPi may be actually generated with only a three-gate delay.

FIG. 5 is a circuit diagram illustrating a structure of the encoding cell shown in FIG. 3; and FIG. 6 is a diagram illustrating a truth table of the inverted logical sum gate, the inverted logical product gate, and the exclusive logical sum gate of the encoding cell shown in FIG. 3. FIGS. 5 and 6 should be occasionally referenced for the following discussion.

As shown in FIGS. 5 and 6, the inverted logical sum gate NOR31 of the encoding cell 310 comprises first and second p-channel metal oxide semiconductor (PMOS) transistors MP1, MP2 and first and second n-channel metal oxide (NMOS) semiconductor transistors MN1, MN2. In the first PMOS transistor MP1, a first terminal of MP1 is connected to a source voltage VDD, and the first multiplier data Y2j-1 are applied to the gate of MP1. In the second PMOS transistor MP2, a first terminal of MP2 is connected to the second terminal of MP1, the second multiplier data Y2j are applied to the gate of MP2, and a second terminal of MP2 is connected to a first output node N1.

In the first NMOS transistor MN1, a first terminal of MN1 is connected to the first output node N1, a second terminal of MN1 is connected to a ground voltage VSS, and the first multiplier data Y2j-1 are applied to the gate of MN1. In the second NMOS transistor MN2, a first terminal of MN2 is connected to the first output node N1, a second terminal of MN2 is connected to the ground voltage VSS, and the second multiplier data Y2j are applied to the gate of MN2.

The exclusive logical sum gate XOR31 and the inverted logical product gate NAND31 of the encoding cell 310 comprise third to fifth PMOS transistors MP3 to MP5 and third to sixth NMOS transistor MN3 to MN6 as shown in FIG. 5. In the third PMOS transistor MP3, a first terminal of MP3 is connected to the source voltage VDD, the first multiplier data Y2j-1 are applied to the gate of MP3, and a second terminal of MP3 is connected to a second output node N2. In the fourth PMOS transistor MP4, a first terminal of MP4 is connected to the source voltage VDD, the second multiplier data Y2j are applied to the gate of MP4, and a second terminal of MP4 is connected to the second output node N2. In the fifth PMOS transistor MP5, a first terminal of MP5 is connected to the second output node N2, the gate of MP5 is connected to the first output node N1, and a second terminal of MP5 is connected to a third output node N3.

In the third NMOS transistor MN3, a first terminal of MN3 is connected to the ground voltage VSS, the gate of MN3 is connected to the first output node N1, and the second terminal is connected to the third output node N3. In the fourth NMOS transistor MN4, a first terminal of MN4 is connected to the third output node N3, and the first multiplier data Y2j-1 are applied to the gate of MN4. In the fifth NMOS transistor MN5, a first terminal of MN5 is connected to the second output node N2, and the first multiplier data Y2j-1 are applied to the gate. In the sixth NMOS transistor MN6, a first terminal of MN6 is connected to corresponding second terminals of the fourth and fifth NMOS transistors MN4, MN5, the second multiplier data Y2j are applied to the gate of MN6, and a second terminal of MN6 is connected to the ground voltage VSS.

As shown in FIG. 5, the third operator n2x is output from the first output node N1. A dotted-line box indicated by a reference numeral 505 in FIG. 5 represents the inverted logical sum gate NOR31 of the encoding cell 310 of FIG. 3. As also shown in FIG. 5, the second operator p2x is output from the second output node N2, and the first operator 1x is output from the third output node N3. A dotted-line box indicated by a reference numeral 510 in FIG. 5 represents the exclusive logical sum gate XOR31 of the encoding cell 310 of FIG. 3.

The encoding cell 310, as shown in FIG. 5, comprises MOS transistors. As can be seen from the truth table of FIG. 6, when the first multiplier data Y2j-1 and the second multiplier data Y2j are all 0, the output of the exclusive logical sum gate XOR31 has the logic level opposite to the output of the inverted logical product gate NAND31. Otherwise, the output of the exclusive logical sum gate XOR31 has the logic level that is the same (equal) to the output of the inverted logical product gate NAND31.

Therefore, in this exemplary embodiment, the exclusive logical sum gate XOR31 is not particularly required for the high-speed action of the encoder 300, but is embodied using the inverted logical product gate NAND31 and the inverted logical sum gate NOR31. In other words, by using only the fifth PMOS transistor MP5 and the third NMOS transistor MN3 in the dotted line box 510 of FIG. 5, the output of the third output node N3 serves as the output of the exclusive logical sum gate XOR31.

When the first multiplier data Y2j-1 and the second multiplier data Y2j have a low level (that is, logic 0), the first output node N1 (representing third operator n2x) and the second output node N2 (representing second operator p2x) output high-level (that is, logic 1) signals. At that time, the third output node N3 (representing first operator 1x) outputs a low-level signal through the fifth PMOS transistor MP5 and the third NMOS transistor MN3.

Referring to the truth table of FIG. 6, when the first output node N1 outputs a logic 0 (i.e., representing the logic state the third operator n2x that is output from the inverted logical sum gate NOR31 gate), the output of the second output node N2 and the third output node N3 are equal to each other (either both 1's or both 0's as shown in FIG. 6). That is, the output of the inverted logical product gate NAND31 is output as the output of the exclusive logical sum gate XOR31 "as is". Therefore, the output of the exclusive logical sum gate XOR31 can be generated from the output of the second output node N2, which is the output of the inverted logical product gate NAND31, by using only two transistors, MP5 and MN3.

Referring again to FIG. 3, in the partial-product data generating unit of the encoder 300 according to this exemplary embodiment, the third multiplier data Y2j+1 of higher (more significant) bits adjacent to the second multiplier data Y2j is output as the sign selecting operator SIGN for determining the signs of the operators 1x, p2x, n2x and also the outputs paths for received multiplicand data, as described in further detail hereafter. The sign selecting operator SIGN may be output from a buffer B34 in a selection circuit 320. Although only one selection circuit 320 is shown for reasons of clarity, the partial-product data generating unit may comprise a plurality of selection circuits 320. Hereinafter, operations of the partial-product data generating unit of the encoder 300 will be described using the selection circuit 320 shown in FIG. 3.

The selection circuit 320 may include a first selection unit 330 and a second selection unit 340. The first selection unit 330 selects the output paths of the received multiplicand data of two bits (Xi, Xi−1) within a plurality of received multiplicand data and zero data ZERO_D in response to the sign selecting operator SIGN. The second selection unit 340 selects the output path of the multiplicand data output from the first selection unit 330 and the multiplicand data output from another or previous selection circuit 320 in the encoder 300 (not shown for reasons of clarity) in response to the first, second, and third operators 1x, p2x, n2x, and outputs the partial-product data PPi−1, PPi.

The first selection unit 330 may include a first multiplexer MUX1 and a second multiplexer MUX2. The first multiplexer MUX1 selects the output paths for first multiplicand data Xi−1 among the multiplicand data, first inverted multiplicand data Xi−1b (which is binary complement data of the first multiplicand data Xi−1) and the zero data ZERO_D, in response to the sign selecting operator SIGN, and outputs Xi−1, Xi−1b and ZERO_D as first to third outputs 1x1, p2x2 and n2x3. The second multiplexer MUX2 selects the output paths of second multiplicand data Xi of higher bits adjacent to the first multiplicand data Xi−1, second inverted multiplicand data Xib (which is binary complement data of the second multiplicand data Xi), and the zero data ZERO_D in response to the sign selecting operator SIGN, and outputs Xi, Xib and ZERO_D as fourth to sixth outputs 1x4, p2x5, n2x6.

FIG. 7A is a diagram illustrating the second multiplexer MUX2 in FIG. 3, and FIG. 7B is a diagram illustrating a structure of the second multiplexer MUX2 in FIG. 7A in more detail. The second multiplexer MUX2 may include a first inverter I71 and first to sixth switches SW1 to SW6.

The first inverter I71 inverts the sign selecting operator SIGN to generate an inverted sign selecting operator I_SIGN. The first switch SW1 passes or intercepts the second multiplicand data Xi as the fourth output 1x4 in response to the inverted sign selecting operator I_SIGN. The second switch SW2 passes or intercepts the second multiplicand data Xi as the fifth output p2x5 in response to the inverted sign selecting operator I_SIGN. The third switch SW3 passes or intercepts the zero data ZERO_D as the sixth output n2x6 in response to the inverted sign selecting operator I_SIGN.

The fourth switch SW4 passes or intercepts the second inverted multiplicand data Xib as the fourth output 1x4 in response to the sign selecting operator SIGN. The fifth switch SW5 passes or intercepts the zero data ZERO_D as the fifth output p2x5 in response to the sign selecting operator SIGN. The sixth switch SW6 passes or intercepts the second inverted multiplicand data Xib as the sixth output n2x6 in response to the sign selecting operator SIGN.

Referring to FIG. 7B, when the sign selecting operator SIGN is a logic "0", the inverted sign selecting operator I_SIGN is a logic "1". Then, the first switch SW1, second switch SW2 and third switch SW3 are turned on, with the fourth to sixth switches SW4, SW5, SW6 being turned off. Therefore, the value of the fourth output 1x4 is the second multiplicand data Xi (SW1 on, SW4 off), and the value of the fifth output p2x5 is also the second multiplicand data Xi (SW2 on, SW4 off). The value of the sixth output n2x6 is the zero data ZERO_D, as shown in FIG. 7B with SW3 on and SW5 off.

On the contrary, when the sign selecting operator SIGN is a logic "1", the inverted sign selecting operator I_SIGN is a logic "0". Then, the first switch SW1, second switch SW2 and third switch SW3 are turned off, and the fourth to sixth switches SW4, SW5, SW6 are turned on. Therefore, the value of the fourth output 1x4 is the second inverted multiplicand data Xib, the value of the fifth output p2x5 is the zero data ZERO_D, and the value of the sixth output n2x6 is the second inverted multiplicand data Xib.

The first multiplexer MUX1 has the same structure as the second multiplexer MUX2 and a brief description of the switch operations based on the sign of the sign selecting operator SIGN is provided below. That is, when the sign selecting operator SIGN is a logic "0", the first through third switches SW1-SW3 of MUX1 are turned on, and the fourth to sixth switches SW4-Sw6 are turned off. Therefore, the value of both the first output 1x1 and the second output p2x2 is the first multiplicand data Xi−1, and the value of the third output n2x3 is the zero data ZERO_D.

On the contrary, when the sign selecting operator SIGN is a logic "1", first through third switches SW1-SW3 of MUX1 are turned off, and the fourth to sixth switches SW4-SW6 of MUX1 are turned on. Thus, the value of both the first output 1x1 and the third output n2x3 is the first inverted multiplicand data Xi−1b, and the value of the second output p2x2 is the zero data ZERO_D.

In this way, the encoder 300 according to the exemplary embodiment carries out an operation process of selecting the output path of the multiplicand data by means of the sign selecting operator SIGN and generating the first to sixth outputs 1x1, p2x2, n2x3, 1x4, p2x5, n2x6, for a delay time of one multiplexer. In other words, the selection of output path and generation of the multiplicand data on the selected output paths only has the single-gate delay of the multiplexer (either MUX1 or MUX2).

The timing for generating the first to sixth multiplicand outputs 1x1, p2x2, n2x3, 1x4, p2x5, n2x6 is equal to the timing for outputting the operators 1x, p2x, n2x. In other words, the sign selecting operator SIGN does not have any influence on the delay time of the encoder 300 based on the operational processing for obtaining the operators 1x, p2x, n2x.

The third multiplexer MUX3 of the second selection unit 340 selects the output path of the first output 1x1 (which is either Xi−1 or Xi−1b, depending on the sign of the sign operator SIGN) from the first multiplexer MUX1, and also the output paths of multiplicand data output from another or previous selection circuit 320 (not shown for clarity) in response to the first to third operators 1x, p2x, n2x, for output as first partial-product data PPi−1, as shown in FIG. 3, for example.

The fourth multiplexer MUX4 selects the output paths of the fourth output 1x4 (which is either Xi or Xib, depending on the sign of the sign operator SIGN) from the second multiplexer MUX2 and the second and third outputs p2x2, n2x3 (the second and third outputs p2x2, n2x3 are also SIGN dependent) from the first multiplexer MUX1 in response to the first to third operators 1x, p2x, n2x, and outputs them as second partial-product data PPi.

Figure 8A:
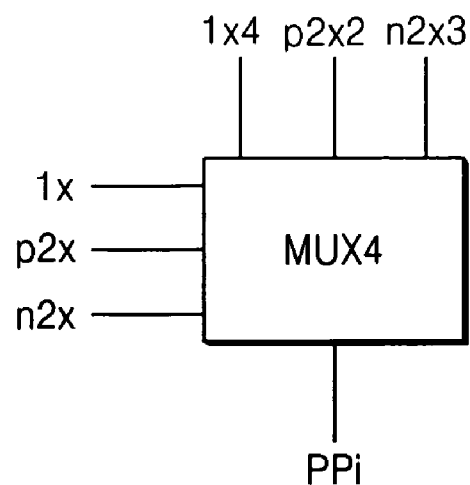
FIG. 8A is a diagram illustrating a fourth multiplexer of FIG. 3.
Figure 8B:
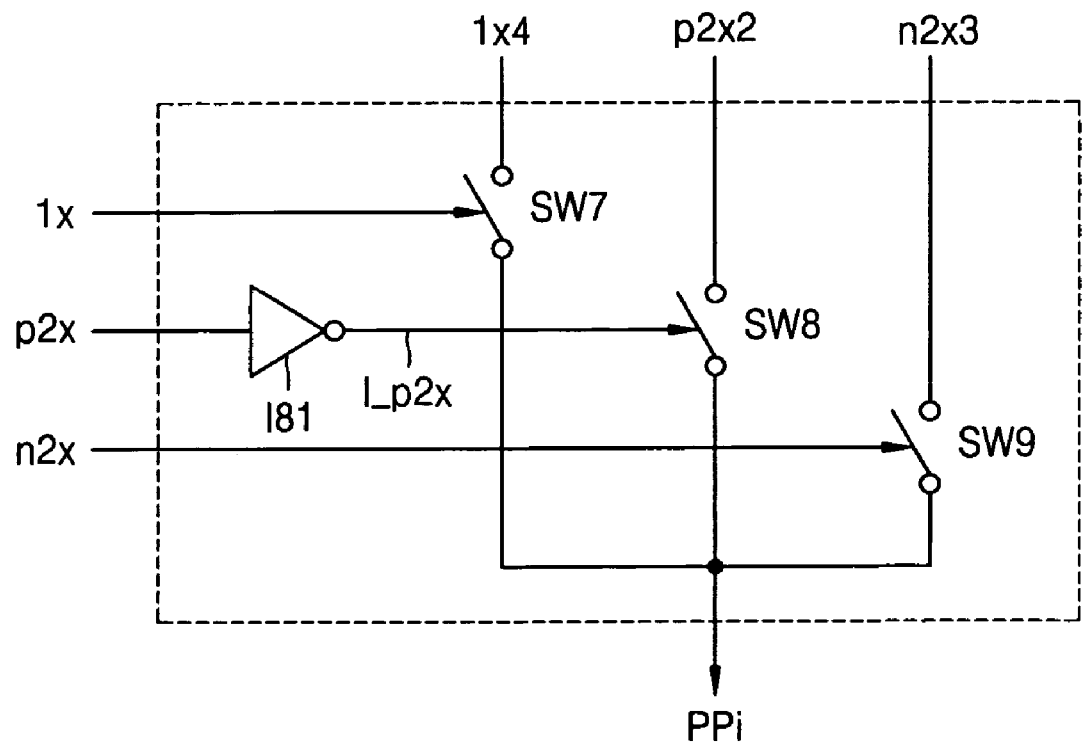
FIG. 8B is a diagram illustrating details of the fourth multiplexer of FIG. 8A.

FIG. 8A is a diagram illustrating the fourth multiplexer MUX4 shown in FIG. 3, and FIG. 8B is a diagram illustrating a structure of the fourth multiplexer MUX4 shown in FIG. 8A in further detail. Since the third multiplexer MUX3 shown in FIG. 3 has the same structure and operation as the fourth multiplexer MUX4 shown in FIGS. 8A and 8B, only the operations of the fourth multiplexer MUX4 for generating the second partial-product data PPi will be described in detail below, it being understood that the operations of MUX3 for generating the first partial-product data PPi−1 are the same.

As shown in FIG. 8B, the fourth multiplexer MUX4 may include a second inverter I81 and seventh to ninth switches SW7, SW8, SW9. The second inverter I81 inverts the second operator p2x to output a inverted second operator I_p2x. The seventh switch SW7 passes or intercepts the fourth output 1x4 as the second partial-product data PPi in response to the first operator 1x. The eighth switch SW8 passes or intercepts the second output p2x2 as the second partial-product data PPi in response to the inverted second operator I_p2x. The ninth switch SW9 passes or intercepts the third output n2x3 as the second partial-product data PPi in response to the third operator n2x.

The second selection unit 340 outputs the multiplicand data selected in the first selection unit 330 in accordance with the sign selecting operator SIGN as the partial-product data PPi−1, PPi in response to the operators 1x, p2x, n2x. Only one operator of the first operator 1x, inverted second operator I_p2x, and third operator n2x is generated into a high level in order to short-circuit only one switch of the seventh to ninth switches SW7, SW8, SW9.

The first operator 1x selects the value of the fourth output 1x4, the inverted second operator I_p2x selects the value of the second output p2x2, and the third operator n2x selects the value of the third output n2x3, so that the values are output as the second partial-product data PPi.

Accordingly, the exemplary encoder 300 for a multiplier is configured to multiply bits of multiplier data with bits of multiplicand data, and to generate partial-product data from the received multiplier data and received multiplicand data with only a three-gate delay. The exemplary encoder 300 may include an operator generating unit for encoding a plurality of received multiplier data to output a plurality of operators with a single-gate delay. The encoder 300 may further include a partial-product data generating unit that generates a sign selecting operator from the received multiplier data for determining signs of the operators and output paths for the multiplicand data therein, prior to receiving the plurality of operators from the operator generating unit, so as to output partial-product data in response to the received plurality of operators with a two-gate delay. The total delay for generating partial product data form the received multiplier and multiplicand data in the exemplary encoder 300 may thus be realized as no more than a three-gate delay.

Therefore, in accordance with the exemplary embodiments, since the encoder 300 according to this exemplary embodiment generates the sign selecting operator SIGN prior to the other operators 1x, p2x, n2x and enables the partial-product data PPi−1, PPi to be generated from the selection circuit 320 of the partial-product data generating unit in a state where the signs of the multiplicand data are determined in advance, it is possible to enhance the operation speed of the encoder 300.

While the present invention has been particularly shown and described with reference to exemplary embodiments thereof, it will be understood by those skilled in the art that various changes in form and details may be made therein without departing from the spirit and scope of the exemplary embodiments of the present invention as defined by the appended claims.

What is claimed is:

1. An encoder of a multiplier configured to multiply multiplier data with multiplicand data, the encoder comprising:
  an operator generating unit for encoding a plurality of received multiplier data to output a plurality of operators; and
  a partial-product data generating unit that generates a sign selecting operator from the received multiplier data for determining signs of the plurality of operators and for determining output paths for the multiplicand data, from one selection unit of the partial-product data generating unit to another selection unit of the partial-product data generating unit, prior to receiving the plurality of operators from the operator generating unit, and that outputs partial-product data in response to the received plurality of operators.

2. The encoder of claim 1, wherein the operator generating unit comprises a plurality of encoding cells,
  wherein each encoding cell is adapted to encode adjacent first and second multiplier data of two bits within the plurality of received multiplier data to output the plurality of operators, and
  wherein the plurality of operators includes at least a first, second, and third operator.

3. The encoder of claim 2, wherein each encoding cell includes:
  an exclusive logical sum gate performing an exclusive logical sum operation on the first and second multiplier data to output the first operator;
  an inverted logical product gate performing an inverted logical product operation on the first and second multiplier data to output the second operator; and
  an inverted logical sum gate performing an inverted logical sum operation on the first and second multiplier data to output the third operator.

4. The encoder of claim 3, wherein the inverted logical sum gate includes:
  a first P-channel Metal Oxide Semiconductor (PMOS) transistor having a first terminal connected to a source voltage and the first multiplier data applied to its gate;
  a second PMOS transistor having a first terminal connected to a second terminal of the first PMOS transistor, the second multiplier data applied to its gate, and a second terminal connected to a first output node;
  a first N-channel Metal Oxide Semiconductor (NMOS) transistor having a first terminal connected to the first output node, a second terminal connected to a ground voltage, and the first multiplier data applied to its gate; and
  a second NMOS transistor having a first terminal connected to the first output node, a second terminal connected to the ground voltage, and the second multiplier data applied to its gate,
  wherein the third operator is output from the first output node.

5. The encoder of claim 3, wherein the exclusive logical sum gate and the inverted logical product gate include:
  a third PMOS transistor having a first terminal connected to a source voltage, the first multiplier data applied to its gate, and having a second terminal connected to a second output node;
  a fourth PMOS transistor having a first terminal connected to the source voltage, the second multiplier data applied to its gate, and having a second terminal connected to the second output node;
  a fifth PMOS transistor having a first terminal connected to the second output node, its gate connected to the first output node, and having a second terminal connected to a third output node;
  a third NMOS transistor having a first terminal connected to the ground voltage, its gate connected to the first output node, and having a second terminal connected to the third output node;
  a fourth NMOS transistor having a first terminal connected to the third output node and the first multiplier data applied to its gate;
  a fifth NMOS transistor having a first terminal connected to the second output node and the first multiplier data applied to its gate; and
  a sixth NMOS transistor having a first terminal connected to the second terminals of the fourth and fifth NMOS transistors, the second multiplier data applied to its gate, and having a second terminal connected to the ground voltage;

wherein the second operator is output from the second output node and the first operator is output from the third output node.

6. The encoder of claim 2, wherein the first operator expresses the multiplicand data as the partial-product data as is, wherein the second operator expresses data, obtained by shifting the multiplicand data toward a more-significant bit, as the partial-product data, and wherein the third operator expresses a binary complement of the partial-product data corresponding to the second operator as the partial-product data.

7. The encoder of claim 6, wherein the received multiplier data further includes third multiplier data of higher bits adjacent to the bits of the second multiplier data, and wherein the partial-product data generating unit receives the third multiplier data as a sign selecting operator that determines the signs of the plurality of operators and the output paths for the multiplicand data.

8. The encoder of claim 7, wherein the partial-product data generating unit comprises a plurality of selection circuits, each selection circuit further including:

a first selection unit that selects an output path of given two-bit multiplicand data within the plurality of received multiplicand data and zero data in response to the sign selecting operator; and a second selection unit that selects output paths of the multiplicand data output from the first selection unit and multiplicand data output from another selection circuit in response to the first, second, and third operators to output the multiplicand data as the partial-product data.

9. The encoder of claim 8, wherein the first selection unit includes:

a first multiplexer that selects output paths for first multiplicand data within the plurality of received multiplicand data, first inverted multiplicand data representing a binary complement of the first multiplicand data, and zero data, in response to the sign selecting operator, for output as first to third outputs; and a second multiplexer that selects output paths for second multiplicand data of higher bits adjacent to the first multiplicand data, inverted second multiplicand data representing a binary complement of the second multiplicand data, and zero data, in response to the sign selecting operator, for output as fourth to sixth outputs.

10. The encoder of claim 9, wherein the second multiplexer includes:

a first inverter that inverts the sign selecting operator to output an inverted sign selecting operator;

a first switch that either passes or intercepts the second multiplicand data as the fourth output in response to the inverted sign selecting operator;

a second switch that either passes or intercepts the second multiplicand data as the fifth output in response to the inverted sign selecting operator;

a third switch that either passes or intercepts the zero data as the sixth output in response to the inverted sign selecting operator;

a fourth switch that either passes or intercepts the inverted second multiplicand data as the fourth output in response to the sign selecting operator;

a fifth switch that either passes or intercepts the zero data as the fifth output in response to the sign selecting operator; and a sixth switch that either passes or intercepts the inverted second multiplicand data as the sixth output in response to the sign selecting operator;

wherein the first multiplexer has a same structure as the second multiplexer.

11. The encoder of claim 9, wherein the second selection unit includes:

a third multiplexer that selects output paths for the first output of the first multiplexer and the multiplicand data output from another selection circuit, in response to the first to third operators, for output as first partial-product data; and a fourth multiplexer that selects output paths of the fourth output from the second multiplexer and the second and third outputs from the first multiplexer, in response to the first to third operators, for output as second partial-product data.

12. The encoder of claim 11, wherein the fourth multiplexer includes:

a second inverter that inverts the second operator to output an inverted second operator;

a seventh switch that either passes or intercepts the fourth output as the second partial-product data in response to the first operator;

an eighth switch that either passes or intercepts the second output as the second partial-product data in response to the inverted second operator; and a ninth switch that either passes or intercepts the third output as the second partial-product data in response to the third operator;

wherein the third multiplexer has a same structure as the fourth multiplexer.

13. An encoder of a multiplier configured to multiply bits of multiplier data with bits of multiplicand data, the encoder comprising:

at least one encoding cell;
a first selection unit; and
a second selection unit;

wherein the at least one encoding cell is adapted to encode adjacent first and second multiplier data of two bits to output at least a first, second, and third operator;

wherein the first selection unit receives third multiplier data of higher bits adjacent to the bits of the second multiplier data as a sign selecting operator for determining the signs of the at least first, second, and third operators, and selects output paths, from the first selection unit, for given two-bit multiplicand data and zero data in response to the sign selecting operator, and wherein the second selection unit selects output paths, from the second selection unit, of the given two-bit multiplicand data output from the first selection unit and multiplicand data output from another selection unit in response to the first, second, and third operators to output the multiplicand data as partial-product data.

14. The encoder of claim 13, wherein the first operator expresses the multiplicand data as the partial-product data as is, wherein the second operator expresses data, obtained by shifting the multiplicand data toward a more-significant bit, as the partial-product data, and wherein the third operator expresses a binary complement of the partial-product data corresponding to the second operator as the partial-product data.

15. An encoder of a multiplier configured to multiply bits of multiplier data with bits of multiplicand data, the encoder comprising:

an operator generating unit; and a partial-product data generating unit;

wherein the partial-product data generating unit is adapted to generate a sign selecting operator from received multiplier data, and wherein the encoder is configured to generate partial-product data from the received multiplier data and received multiplicand data with a total of only a three-gate delay in the operator generating unit and the partial-product data generating unit.

16. The encoder of claim 15, wherein the operator generating unit is adapted to encode a plurality of received multiplier data to output a plurality of operators with a single-gate delay, and wherein the sign selecting operator is used for determining signs of the plurality of operators and for determining output paths for the multiplicand data, from a first selection unit of the partial-product data generating unit to a second selection unit of the partial-product data generating unit, prior to receiving the plurality of operators from the operator generating unit, so as to output partial-product data in response to the received plurality of operators with a two-gate delay.

17. A method of generating partial-product data in an encoder of a multiplier configured to multiply multiplier data with multiplicand data, the method comprising:

encoding, in an operator generating unit of the encoder, a plurality of received multiplier data to output a plurality of operators;

generating, in a partial-product data generating unit of the encoder, a sign selecting operator from the received multiplier data for determining signs of the plurality of operators and for determining output paths for multiplicand data, from a first selection unit of the partial-product data generating unit to a second selection unit of the partial-product data generating unit, prior to receiving the plurality of operators; and outputting, from the encoder, partial-product data in response to the received plurality of operators.

18. An encoder of a multiplier configured to multiply multiplier data with multiplicand data to generate partial-product data in accordance with the method of claim 17.

19. An encoder of a multiplier configured to multiply bits of multiplier data with bits of multiplicand data, the encoder configured to generate partial-product data from received multiplier data and received multiplicand data with only a three-gate delay in accordance with the method of claim 17.

20. A partial-product data generating unit for an encoder of a multiplier configured to multiply multiplier data with multiplicand data, the partial-product data generating unit comprising:

a first selection unit; and a second selection unit;

wherein the partial-product data generating unit generates a sign selecting operator from received multiplier data for determining signs of a plurality of operators to be received by the partial-product data generating unit, for determining output paths for multiplicand data from the first selection unit to the second selection unit, prior to receiving the plurality of operators, and for outputting partial-product data in response to the received plurality of operators.

21. An operator generating unit for an encoder of a multiplier configured to multiply multiplier data with multiplicand data, the operator generating unit comprising:

at least one encoding cell, the encoding cell including an exclusive logical sum gate performing an exclusive logical sum operation on adjacent bits of first and second multiplier data to output a first operator, an inverted logical product gate performing an inverted logical product operation on the first and second multiplier data to output a second operator, and an inverted logical sum gate performing an inverted logical sum operation on the first and second multiplier data to output a third operator.

22. An encoder of a multiplier configured to multiply multiplier data with multiplicand data, the encoder including the partial-product data generating unit of claim 20.

23. An encoder of a multiplier configured to multiply multiplier data with multiplicand data, the encoder including the operator generating unit of claim 21.

* * * * *